Dec. 19, 1967 R. N. HALL 3,359,507

SEMICONDUCTOR JUNCTION LASER DEVICE

Filed Feb. 19, 1964

Inventor:
Robert N. Hall,
by John F. Ahern
His Attorney.

United States Patent Office 3,359,507

Patented Dec. 19, 1967

3,359,507
SEMICONDUCTOR JUNCTION LASER DEVICE

Robert N. Hall, Schenectady, N.Y., assignor to General Electric Company, a corporation of New York Filed Feb. 19, 1964, Ser. No. 345,884
11 Claims. (Cl. 331—94.5)

The present invention relates to semiconductor junction laser devices that provide radiation falling within a very narrow band of the electromagnetic spectrum.

Semiconductor diodes adapted to provide generation of stimulated coherent radiation are described in an article entitled, "Coherent Light Emission From P-N Junctions," appearing in Solid-State Electronics, Vol. 6, page 405, 1963, that is intended to be incorporated herein by reference thereto. Diodes of this type are referred to herein, and in the appended claims, as semiconductor junction lasers.

The discovery of the semiconductor junction laser enabled more efficient generation of stimulated coherent radiation of light, not necessarily visible but infrared as well, and also of microwave frequencies, utilizing less complex equipment. The semiconductor junction laser emits a narrow beam of coherent radiation, oftentimes emitted from a desirably small portion of the junction edge, characterized by frequencies falling within a narrow band of the electromagnetic spectrum. The latter characteristic is frequently referred to as a narrow bandwidth, or "line-width" when applied to lasers. There are applications, however, where even a narrower linewidth is desirable and sometimes it is preferred that the distribution of light intensity along the junction edge be substantially uniform.

Accordingly, it is an object of my invention to provide a semiconductor junction laser device providing substantially uniform emission along the junction edge.

Another object of my invention is to provide a semiconductor junction laser device capable of providing radiation of narrower linewidth.

Still another object of my invention is to provide a semiconductor junction laser device that emits radiation of very narrow linewidth and of substantially uniform intensity along the junction edge.

Yet another object of my invention is to provide a semiconductor junction laser device that achieves the above objects and which is relatively simply and economically fabricated.

Briefly, in one embodiment of my invention, I provide a semiconductor junction laser wherein the junction is shaped substantially as a hollow right circular cylinder and is symmetrical about a central axis. Radiation is propagated parallel to the axis of symmetry between the two end surfaces that are perpendicular to the junction and, preferably, are partially reflecting. A double reflecting cavity is located contiguous with one of the end surfaces. Radiation leaving one point of the junction through this end surface and into the reflecting cavity is returned to the junction at the symmetrically opposite point, relative to the axis of symmetry, providing greater uniformity of illumination at the junction edge. The cavity dimensions are advantageously selected to be much larger than the dimensions of the laser junction, in the direction of wave propagation, so that the cavity provides an additional resonant system which includes a large number of integral half wavelengths. Thus, a high frequency system is provided for the device which yields radiation that possesses a narrow linewidth and more uniform distribution of intensity along the junction edge.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which:

Figure 1:
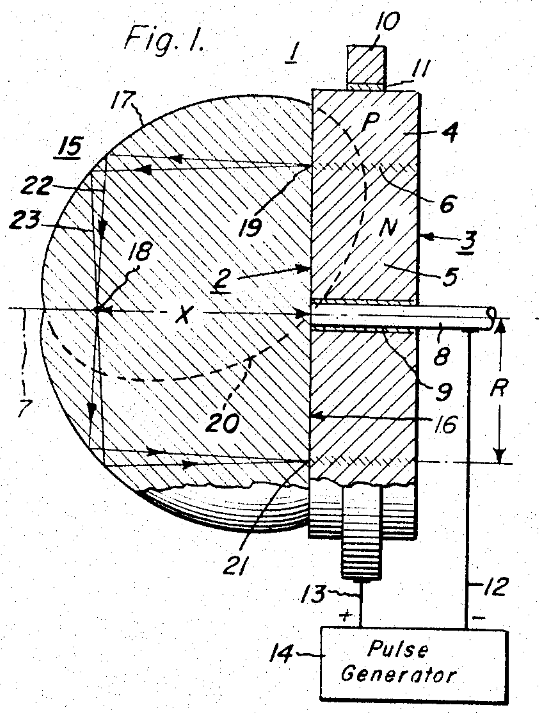
FIGURE 1 is a semi-schematic drawing of a semiconductor junction laser device in accord with my invention.

In the embodiment of my invention that is illustrated in FIGURE 1 of the drawings, a stimulated coherent emission semiconductor device comprises a monocrystalline body 1 of semiconductive material. Body 1 is approximately cylindrical in shape and includes a pair of spaced substantially planar end surfaces 2 and 3 that are parallel to each other and perpendicular to the central axis 7 of body 2. There are two degenerately impregnated regions coaxially disposed in body 1 that are illustrated as P-type region 4, on the outside, and N-type region 5, on the inside. Between, and contiguous with, regions 4 and 5 is a very thin P-N junction region 6 that describes a circle at its intersection with each of surfaces 2 and 3. Electrodes 8 and 10 are connected to regions 5 and 4, respectively, by solder layers 9 and 11, respectively. Conductors 12 and 13 connect the electrodes to a suitable source of electric current, shown generally at 14.

In accord with my invention, a reflector 15, shaped substantially as an ellipsoid, has a planar surface 16 contiguous with surface 2. Reflectors of the type envisaged for use in accord with my invention are referred to herein, and in the appended claims, as "double reflectors" to indicate that at least two reflections occur therein before radiation entering the reflector exits therefrom. Curved surface 17, of reflector 15, is adapted to reflect radiation from any point along the intersection of region 6 and surface 2 back to the symmetrically opposite point of region 6, relative to axis 7.

The material of semiconductor crystal body 1 is composed in general of a compound semiconductor or an alloy of compound semiconductors from the Group III–V (of the Periodic Table) class that are denominated as direct transition semiconductors (adapted to direct transitions of electrons between valance and conduction bands) and may include, by way of example, gallium arsenide, indium antimonide, indium arsenide, indium phosphide, gallium antimonide and alloys therebetween and may further include direct transition alloys of other materials such as alloys of gallium arsenide and gallium phosphide (indirect by itself) in the range of 0 to 50 atomic percent of gallium phosphide. For a further discussion of direct transition semiconductors reference is hereby made to an article by H. Ehrenreich in the Journal of Applied Physics, vol. 32, page 2155 (1961). Other suitable direct transition semiconductive materials include lead sulphide, lead selenide and lead telluride. In these materials indium is suitable as a donor and excess anion is suitable as an acceptor. The wavelength of emitted radiation depends upon the band gap (the energy difference between the conduction band and valence band) of the chosen material.

Monocrystalline body 1 is adapted to provide stimulated coherent emission by providing therein a degenerately impregnated, or doped, P-type region 4 (having degenerate P-type conductivity characteristics) and a degenerately impregnated, or doped, N-type region 5 (having degenerate N-type conductivity characteristics). Both the P-type and N-type regions of semiconductive crystal 1 are impregnated, or doped, with acceptor and donor activators, respectively, to cause degeneracy therein.

As used herein, a body is considered to be degenerate P-type when it contains a sufficient concentration of excess acceptor impurity carriers to depress the Fermi level to an energy lower than the maximum energy of the valence band on the energy band diagram for the semiconductive material. Similarly, a body is considered to be degenerate N-type when it contains a sufficient concentration of excess donor impurity carriers to raise the Fermi level thereof to a value of energy higher than the minimum energy of the conduction band on the energy band diagram of the semiconductive material.

Degeneracy is usually obtainable when the excess positive conduction carrier concentration exceeds $10^{18}$ per cubic centimeter or when the excess negative conduction carrier concentration exceeds $10^{17}$ per cubic centimeter. The Fermi level of such an energy band diagram is that energy at which the probability of their being an electron present in a particular state is equal to one half.

A very thin (having a thickness in the order of from 300 angstrom units to 20,000 angstrom units) region 6 is located between and contiguous with the P-type region 4 and N-type region 5. This third region, that is a P-N junction region, possesses conductivity characteristics intermediate the conductivity characteristics of the first and second regions, 4 and 5, respectively.

As illustrated in FIGURE 1, P-N junction region 6 terminates at substantially planar surface 2 and has an axis of symmetry 7 that is perpendicular to surface 2. Thus, P-N junction region 6 extends linearly, in the direction of axis 7, between parallel surfaces 2 and 3.

In order to cause a population inversion in region 6 and emission of stimulated coherent radiation from within the body 1 out through and substantially perpendicular to surface 2, it is necessary to provide means for applying a unidirectional current to monocrystalline body 1 that is sufficient to bias region 6 in a forward direction. In the illustration of FIGURE 1, non-rectifying contact is made between the P-type region 4 and a first electrode 10 by means of an acceptor type or electrically neutral solder layer 11 and a non-rectifying connection is made between N-type region 5 and a second electrode 8 by means of a donor type or electrically neutral solder layer 9. Electrodes 8 and 10 are adapted to be connected to a suitable source of unidirectional current.

In operation, electrodes 8 and 10 are advantageously connected to a source of pulsed direct current, as by conductors 12 and 13, respectively, which are illustrated schematically as connecting the electrodes to pulse generator 14. The pulse generator is adapted to supply pulses of direct current at high current levels, as for example, of approximately 2,000 to 50,000 amperes per square centimeter of junction area for a gallium arsenide diode at 77° K. The pulse width to avoid overheating is conveniently kept to a level of approximately 1 to 10 microseconds.

It has been found that the threshhold for stimulated coherent light emission from a gallium arsenide diode, for example, is related to the temperature of the diode, and it may be convenient to subject the diode to a low temperature to lower the threshold for coherent emission and preclude the necessity of a high current source. Thus, for example, when a diode of gallium arsenide is immersed in a Dewar of liquid air at a temperature of approximately 77° K. the threshold for coherent emission occurs at approximately 2000 amperes per square centimeter and decreases to less than 200 amperes per square centimeter at 20° K. When the junction area is approximately .005 square centimeter, for example, a ten ampere pulsed current source is sufficient at 77° K., as is one ampere source at 20° K.

The semiconductor junction device of FIGURE 1 includes a reflector 15 that is fabricated from a body of material that is transparent to coherent radiation emitted from junction 6. Reflector 15 has a substantially planar surface 16 that is contiguous with substantially planar surface 2 of monocrystalline body 1. Reflector 15 also includes a curved reflecting surface 17 that is adapted to provide double reflection of radiation emitted through surfaces 2 and 16 from one point in region 6 to the corresponding symmetrically opposite point of region 6, relative to axis 7.

In FIGURE 1, reflector 15 is shaped substantially as an ellipsoid having a central focal point 18 and a continuous line of foci, including point 19, that is substantially coincident with the intersection of region 6 and surface 2. The shape of curve 17 is described by rotation of an ellipse, that is perpendicular to axis 7 and has one focal point lying on axis 7 and the other focal point lying in the edge of junction region 6, about axis 7. Preferably the major diameter of the ellipse is equal to $R+X$, where R is the junction radius and X is the distance of the central focus point 18 from surface 2.

In operation, reflector 15 receives radiation emitted from the edge of junction 6, as from point 19, and returns the radiation after two reflections to the corresponding symmetrically opposite point of junction 6, as point 21 in FIGURE 1. The path length is independent of the angle of incidence into reflector 15 and paths, such as 22 and 23, contain equal numbers of half wavelengths at any frequency of radiation. The path length is equal to two times the major diameter of the ellipse, as completed by dashed line 20. Thus, reflector 15 returns the coherent radiation to junction 6 in the same phase, regardless of the particular path traveled.

Not only are all path lengths, as 22 and 23, equal in length with the ellipsoid structure of FIGURE 1, but also all of the radiation entering reflector 15 passes through a central focus point 18. The intensity of radiation at this point is accordingly very high and phenomena that effect changes in the propagation of radiation occurring in the vicinity of point 18 can, conveniently, be used to provide modulation of the coherent emission. Because the reflector returns light emitted from one point in junction region 16 to the corresponding symmetrically opposite point thereof, illumination of junction region 6 is made more uniform and a more uniform intensity of radiation is emitted from along the edge of region 6 that intersects surface 3, where the useful output radiation is normally emitted. Thus, points of higher intensity will, in general, supply energy to the corresponding symmetrically opposite points having a lesser intensity.

Because the semiconductor junction devices that are normally fabricated are oftentimes about equal in size to a grain of table salt, it is oftentimes desirable to approximate the ellipsoid reflector shape illustrated in FIGURE 1 by a spherical segment reflector. This is based for the most part upon the practical consideration that the present state of the art readily permits grinding and polishing of spherical surfaces, or segments thereof, whereas aspherical surfaces are somewhat more difficult and costly to fabricate. Thus, a spherical reflector body is to be desired generall, and particularly when mass production of the devices is contemplated.

Figure 2:
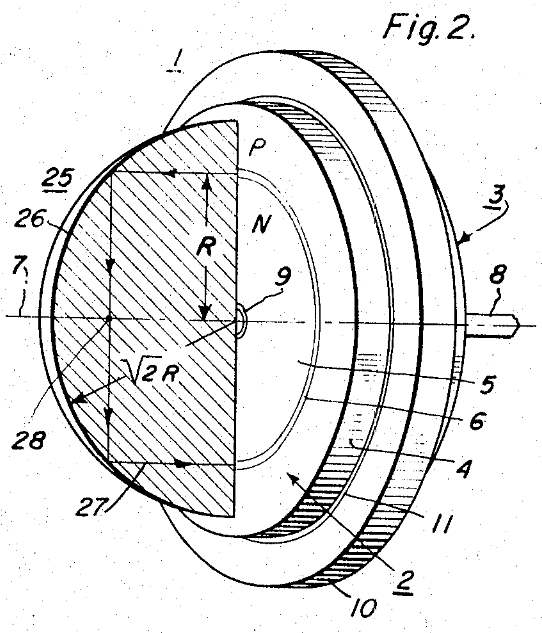
FIGURE 2 is a partial illustration of a laser as shown in FIGURE 1, but having a reflecting cavity of simpler geometrical configuration.

FIGURE 2 illustrates a semiconductor junction laser device having a hemispherical reflector 25 and I have found to provide a very close approximation to the ellipsoid reflector 15 of FIGURE 1, for purposes of my invention, when dimensioned as shown in FIGURE 2. More particularly, the hemispherical reflector 25 is constructed with a radius equal to $\sqrt{2R}$, where R is the average radial distance of the region 6 from axis of symmetry 7. Thus, curved surface 26 of reflector 25 is the locus of all points external of semiconductor body 1 located a distance $\sqrt{2R}$ from the intersection of axis 7 and substantially planar surface 2. The effectiveness of reflector 25 is enhanced by the fact that substantially all of the radiation emitted from junction region 6 into the reflector is approximately parallel to axis 7. Because of this, only the spherical segment located at a radial distance R from axis 7 need be formed with great exactitude. The remainder of the reflector body may in fact be highly irregular without substantially impairing the operation of reflector 25, in most cases.

In operation, radiation leaving junction region 6 substantially parallel to axis 7, as depicted by ray 27, is returned after a double reflection to the corresponding symmetrically opposite point of the junction region as with the reflector 15 of FIGURE 1. All of such radiation passes through a central focus point 28 located on axis 7 a distance equal to R from the intersection of axis 7 and substantially planar surface 2. Thus, reflector 25 performs in substantially the same manner as previously discussed in connection with reflector 15 of FIGURE 1, to provide emission of reduced linewidth from a more uniformly illuminated junction.

Figure 3:
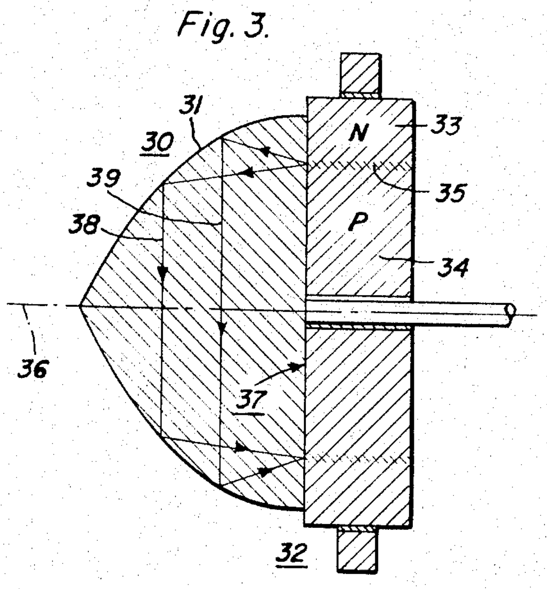
FIGURE 3 is a partial semi-schematic drawing of a laser of the general type shown in FIGURE 1 having an alternative reflecting cavity suitable for use in accord with my invention; and, FIGURE 4 is a partial illustration of a laser as shown in FIGURE 3, but having a reflecting cavity of simpler geometrical configuration.

There is at least one other body of revolution having a curved surface described by a second order equation, or quadratic function, suitable for use in accord with my invention. For example, the ellipsoid reflector of FIGURE 1 is equally advantageously formed as a paraboloid reflector in most applications. FIGURE 3 illustrates a semiconductor junction laser device in accord with this invention having a reflector 30 with a substantially parabolic curved surface 31.

The light source of FIGURE 3 differs from that of FIGURES 1 and 2 by having the relative position of the N and P-type regions reversed. Of course, the coherent light source of FIGURE 3 is equally advantageously used in the embodiments illustrated in FIGURES 1 and 2, and vice versa.

There is shown in FIGURE 3 a monocrystalline body of semiconductive material, generally indicated at 32, having a degenerate N-type region 33 and degenerate P-type region 34 with a very thin third region 35 located between and contiguous with regions 33 and 34. The aforementioned regions are coaxially disposed relative to axis of symmetry 36 and region 35 terminates in a substantially planar surface 37 that corresponds to surface 2 of FIGURES 1 and 2.

Curved surface 31 is defined by rotation of a parabola, that is perpendicular to axis 36 and has its focal point lying substantially at the intersection of region 35 and surface 37, about axis 36. Radiation, illustrated as rays 38 and 39, emitted from junction region 35 and entering reflector 30 are returned to the corresponding symmetrically opposite point of region 35. As in the prior embodiment of FIGURE 1, the length of the path traveled by all such radiation is equal and independent of the angle of incidence into reflector 30. With the paraboloid the path length is equal to two times the junction radius plus four times the focal length of the reflector. There is, however, no central focal point within the reflector 30 as was the case with reflectors 15 and 25 of FIGURES 1 and 2, respectively. This is advantageous in applications wherein a point of extremely high intensity within the reflector is not desired.

Figure 4:
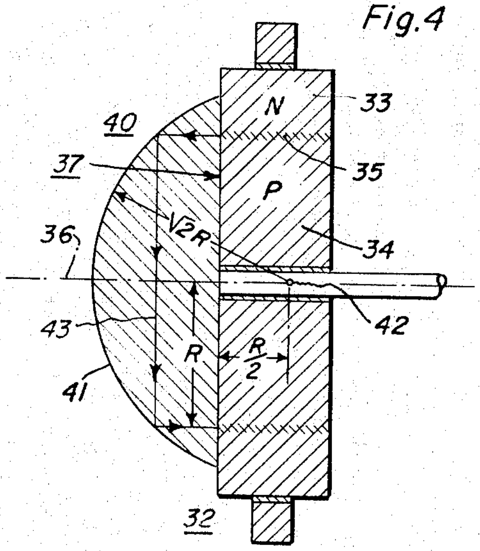

FIGURE 4 illustrates a device, substantially as shown in FIGURE 3, but having a reflector 40 formed substantially as a segment of a sphere that approximates the paraboloid reflector 30 of FIGURE 3. Reflector 40 has a curved surface 41 which is the locus of points external of body 32 lying a distance equal to $\sqrt{2}R$ from the point within the body 32 on axis 36 of symmetry spaced from surface 37 a distance equal to $R/2$, where R is the average radial distance of junction 35 from axis 36. As in the embodiment of FIGURE 2, the spherical approximation is aided in its performance by the fact that substantially all of the radiation from junction region 35 is substantially parallel to axis 36, and, also, this fact allows substantially unimpaired operation when curved surface 41 of reflector 40 is fabricated to great precision only in that segment lying a perpendicular distance approximately equal to R from axis 36. Radiation, depicted by ray 43, is doubly reflected within reflector 40 and returned to the symmetrically opposite point of region 35, as in the prior embodiment.

There are, of course, a plurality of processes by which the various devices in accord with my invention can be fabricated. One highly desirable method is to form a thin monocrystalline wire of N-type gallium arsenide which is impregnated, or doped, with approximately $10^{18}$ atoms per cubic centimeter of tellurium. The impregnation is achieved, conveniently, by growth from a melt of gallium arsenide containing at least $5 \times 10^{18}$ atoms per cubic centimeter of tellurium to cause the resulting crystal to be degenerately N-type. The thin wire is advantageously grown by seed crystal withdrawal technique, for example, in accord with the teaching of my U.S. Patent application, Ser. No. 60,989, filed Oct. 6, 1960, that is assigned to the assignee of the present invention. Alternatively the wire can be cut from a larger existing crystal.

The junction is then diffused into the monocrystalline wire, as by heating to a temperature of about 900° C. for approximately one half hour in an evacuated sealed quartz envelope containing the crystal and about 10 milligrams of zinc, in the case of a gallium arsenide crystal. The P-N junction so formed is approximately 0.05 millimeter below all surfaces of the crystal. The wire is cut into discs about 0.2 millimeter thick, a small hole is drilled through the center of one selected disc and the entire surface of the disc is coated with a conductive film, as by electroplating, that is thereafter sintered to ensure subsequent good electrical contact. The flat sides are lapped to remove the conductive film therefrom and then these surfaces are polished to exact parallelism. The ring and rod electrodes are positioned and soldered in place to complete the elemental laser structure.

The reflector is fabricated, conveniently, from any of a plurality of materials, including, for example, pure GaAs, optical glass, ZnS, MG0 and $Al_20_3$. With the exception of GaAs, these materials are also suitable in the case where harmonic generation is to be encouraged with the ellipsoid reflector because their band gaps are more than double that of GaAs. Zn0 is a preferred material for the reflectors of my invention because not only is the band gap about double that of GaAs, but also the refractive index of ZnO closely matches that of GaAs for improved optical properties at the respective interfaces.

A body of the selected reflector material is cut and ground to provide the desired ellipsoid, paraboloid, or approximating spherical segment and the surfaces thereof polished to optical smoothness. The precise dimensions of the curved surface are readily obtained from most texts describing plane analytic geometry, including, for example, the "Handboook of Engineering Fundamentals," 2nd Edition, by Eshbach, commencing at page 2–82 therein. With most reflector materials, for example, GaAs, the angles of incidence on the curved surfaces of the reflectors envisaged in my invention normally provide total internal reflection and therefore usually no silvering or other reflecting coating is required, though such coating may be desirable with some materials, for example, optical glass, depending largely upon the reflecting index of the material.

The reflector body and laser element are advantageously joined by pressing their respective contigous flat surfaces into optical contact in a jig, that can conveniently include two flat glass plates biased together and sandwiching the two bodies togeher. Alternative means, for joining the reflector and laser element, well-known to those skilled in the art, include the use of refractive-index-matching cement, as Canada balsam (particularly when the reflector is fabricated from optical glass), and the use of an intervening layer of immersion oil of the type often used with microscope analysis. The latter method of joining offers the additional advantage of allowing controlled relative movement between the reflector and laser element for alignment and calibration purposes, for example.

A wide choice of material exists for fabrication of the reflector. The principal requirement is that the material be substantially transparent, and preferably entirely transparent, at the frequency of coherent radiation from the laser. Additionally, the embodiments of FIGURES 1 and 2, wherein all of the radiation passes through a central focal point, oftentimes results in generation of second and higher order harmonics owing to non-linearity of the transmitting medium at extremely high intensity. Accordingly, in devices wherein harmonics are desired the material is advantageously selected to be transparent at their respective frequencies and, conversely, in applications wherein the harmonics represent undesired components they are advantageously discouraged by providing a material wherein they are absorbed.

There has been shown and described herein a semiconductor junction laser device that is capable of emitting radiation having a narrower linewidth and of great uniformity. Both are achieved by providing a laser with a curved reflecting cavity that contributes a second resonant system to more closely define the limits of the frequency of radiation. Narrower linewidth is achieved because of the increase in frequency selectivity gained from the resonance characteristics of the reflector. In addition, great mode separation is possible by ensuring that the resonance frequencies of the reflector and laser body coincide only at the desired operating frequency. Uniformity of junction illumination is promoted by coupling symmetrically opposite points of the junction to each other. A most useful feature of uniform junction illumination is that angular divergence of the beam emitted from the junction is reduced to about the limit set by diffraction, or approximately 0.1°. In the specific cylindrical embodiments illustrated, a highly desirable conic beam is provided that is readily adapted to a plurality of uses, including target acquisition and tracking.

While only certain preferred features of the invention have been shown by way of illustration, many modifications and changes will occur to those skilled in the art. For example, the laser junction need not be substantially cylindrical in shape, but could equally well be approximated by two flat parallel junctions spaced by a distance that is long, relative to their width, either side of the axis of symmetry. It is, therefore, to be understood that the appended claims are intended to cover this and all such other modifications and changes as fall within the true spirit and scope of the invention.

What I claim as new and desire to secure by Letters Patent of the United States is:

1. A semiconductor device for providing stimulated radiation comprising: a crystalline semiconductive body having a P-N junction region therein that is substantially symmetrically disposed relative to an axis and terminates in a planar surface of said body which is perpendicular to said axis; said junction region being adapted to emit radiation, from the edge thereof terminated by said surface, through said surface in a direction that is approximately parallel to said axis, in response to electrical excitation; means for providing said excitation; and external reflector means adjacent said junction for receiving said radiation from one portion of said edge, said reflector being shaped for double reflection of the radiation so received to the symmetrically opposite edge portion of said region.

2. A semiconductor junction laser device comprising: a crystalline body of semiconductive material having a P-N junction region therein that is substantially symmetrically disposed relative to an axis and terminates in a planar surface of said body which is perpendicular to said axis; said junction region being adapted to emit coherent radiation through said surface in a direction that is approximately parallel to said axis in response to electrical excitation; means for providing said excitation; and, a reflector comprising a body of material that is transparent to said radiation, said reflector body having a curved surface that is substantially symmetrical with respect to said axis, said reflector being structually related to said junction in such a way as to provide double reflection of said radiation emitted from any one portion of said junction region to the symmetrically opposite portion of said junction region relative to said axis to provide more uniform radiation from said junction region.

3. The device of claim 2 wherein said reflector has a shape substantially similar to an ellipsoid having a central focus point external of said body lying on said axis and a line of foci approximately coinciding with the intersection of said junction region and said surface.

4. The device of claim 2 wherein said junction is located approximately equal to a radial distance R from said axis and said reflector is shaped substantially as a hemisphere of radius equal to $\sqrt{2}R$ and located symmetrically relative to said axis.

5. The device of claim 2 wherein said reflector has a shape substantially similar to a paraboloid having said axis as the axis of revolution thereof and having a line of foci approximately coinciding with the intersection of said junction region and said surface.

6. The device of claim 2 wherein said junction is located approximately equal to a radial distance R from said axis and the curved surface of said reflector is substantially the locus of points external of said body that are a distance equal to about $\sqrt{2}R$ from a point on said axis within said body spaced a distance equal to $R/2$ from said surface.

7. A stimulated coherent emission semiconductor device comprising: a monocrystalline body of direct transition semiconductive material, said body having at least one substantially planar surface; a first region within said body having degenerate P-type conductivity characteristics; a second region within said body having degenerate N-type conductivity characteristics; a very thin third region located between and contiguous with said first and second regions having conductivity characteristics intermediate the conductivity characteristics of said first and second regions, said third region terminating at said substantially planar surface and having an axis of symmetry that is perpendicular to said substantially planar surface; means for applying a unidirectional current to said monocrystalline body sufficient to bias said regions in the forward direction to cause a population inversion and emission of stimulated coherent radiation through at least said substantially planar surface; and, a reflector comprising a body of material that is transparent to said radiation, said reflector body having a substantially flat surface that is contiguous with said substantially planar surface and a curved reflecting surface for providing double reflection of radiation emitted through said flat and planar surfaces from one point of said third region along the intersection with said surface to the corresponding symmetrically opposite point of said third region along the intersection with said surface.

8. The device of claim 7 wherein said reflector has a shape substantially similar to an ellipsoid having a central focus point external of said body lying on said axis and a line of foci approximately coinciding with the intersection of said third region and said substantially planar surface.

9. The device of claim 7 wherein said third region is located approximately equal to a radial distance R from said axis and said reflector is shaped substantially as a hemisphere having the curved surface thereof located a distance about equal to $\sqrt{2}R$ from the point of intersection of said axis and said substantially planar surface.

10. The device of claim 7 wherein said reflector has a shape substantially similar to a paraboloid having said axis as the axis of revolution thereof and having a line of foci approximately coinciding with the intersection of said third region and said substantially planar surface.

11. The device of claim 7 wherein said third region is located approximately equal to a radial distance R from said axis and the curved surface of said reflector is substantially the locus of points external of said body that are a distance equal to about $\sqrt{2}R$ from a point on said axis within said body spaced a distance $R/2$ from said substantially planar surface.

References Cited

UNITED STATES PATENTS

| | | | |
|---|---|---|---|
| 3,289,101 | 11/1966 | Masters et al. | 331—94.5 |
| 3,303,432 | 2/1967 | Garfinckel et al. | 331—94.5 |

JEWELL H. PEDERSEN, *Primary Examiner.*

E. S. BAUER, *Assistant Examiner.*